(12) United States Patent
Poole

(10) Patent No.: US 10,242,368 B1
(45) Date of Patent: Mar. 26, 2019

(54) SYSTEM AND METHOD FOR PROVIDING SOFTWARE-BASED CONTACTLESS PAYMENT

(71) Applicant: CAPITAL ONE FINANCIAL CORPORATION, McLean, VA (US)

(72) Inventor: Thomas S. Poole, Chantilly, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 529 days.

(21) Appl. No.: 13/653,759

(22) Filed: Oct. 17, 2012

Related U.S. Application Data

(60) Provisional application No. 61/547,910, filed on Oct. 17, 2011.

(51) Int. Cl.
*G06Q 20/42* (2012.01)
*G06Q 20/40* (2012.01)

(52) U.S. Cl.
CPC ......... *G06Q 20/425* (2013.01); *G06Q 20/409* (2013.01)

(58) Field of Classification Search
CPC .... H04L 63/0807; G06Q 40/00; G06Q 20/42; G06Q 20/409
USPC .......................................................... 705/44
See application file for complete search history.

(56) References Cited

U.S. PATENT DOCUMENTS

| | | | | |
|---|---|---|---|---|
| 6,023,682 | A * | 2/2000 | Checchio | G06Q 20/04 705/17 |
| 2002/0137625 | A1* | 9/2002 | Jost | B01J 31/124 502/158 |
| 2002/0138769 | A1* | 9/2002 | Fishman | G06Q 20/341 726/21 |
| 2006/0022033 | A1* | 2/2006 | Smets | G06Q 20/32 235/380 |
| 2006/0212502 | A1* | 9/2006 | Chatterjee | G06T 5/20 708/300 |
| 2007/0262138 | A1* | 11/2007 | Somers | G06Q 20/341 235/380 |
| 2008/0208681 | A1* | 8/2008 | Hammad | G06Q 20/045 705/13 |
| 2008/0223918 | A1* | 9/2008 | Williams | G06Q 20/20 235/379 |
| 2008/0277465 | A1* | 11/2008 | Pletz | G06Q 20/24 235/379 |

(Continued)

OTHER PUBLICATIONS

"Aloul Fadi, Zahidi Syed, El-Hajj Wassim", Two Factor Authentication Using Mobile Phones, May 1, 2009, 2009 IEEE/ACS International Conference on Computer Systems and Applicaitons, pp. 641-644 (Year: 2009).*

(Continued)

*Primary Examiner* — Eric T Wong
*Assistant Examiner* — Kevin T Poe
(74) *Attorney, Agent, or Firm* — Troutman Sanders LLP; Christopher J. Forstner; John A. Morrissett

(57) ABSTRACT

Systems and methods provide software-based contactless payments. According to various embodiments, a system for software-based contactless payment includes a token manager that generates a token and provides the token to a mobile device of a customer for use with a transaction, a communication interface that receives the token in association with a transaction, and a processor that processes the token using to determine whether to authorize the transaction.

17 Claims, 4 Drawing Sheets

(56) References Cited

U.S. PATENT DOCUMENTS

| | | | |
|---|---|---|---|
| 2008/0319905 A1* | 12/2008 | Carlson | G06Q 20/04 705/44 |
| 2009/0210315 A1* | 8/2009 | Jean | G06Q 20/12 705/26.1 |
| 2009/0240626 A1* | 9/2009 | Hasson | G06Q 20/10 705/75 |
| 2010/0146263 A1* | 6/2010 | Das | G06Q 20/385 713/155 |
| 2010/0223186 A1* | 9/2010 | Hogan | G06Q 20/02 705/71 |
| 2010/0262542 A1* | 10/2010 | Kranzley | 705/44 |
| 2010/0276484 A1* | 11/2010 | Banerjee | G06Q 30/06 235/379 |
| 2011/0251892 A1* | 10/2011 | Laracey | G06Q 30/0253 705/14.51 |
| 2012/0028609 A1* | 2/2012 | Hruska | G06Q 20/3674 455/411 |
| 2012/0310838 A1* | 12/2012 | Harris | G06Q 20/12 705/65 |
| 2013/0091061 A1* | 4/2013 | Caulkett et al. | 705/65 |
| 2013/0110658 A1* | 5/2013 | Lyman et al. | 705/18 |

OTHER PUBLICATIONS

"Woo Jungha, Bhagav-Spantzel Abhilasha, Bertino Elisa, Cinzia Squicciarini Anna", Verification of Receipts from M-Commerce Transactions on NFC Cellular Phones, 2008, 10th IEEE Conference on E-Commerce Technology and the Fifth IEEE Conference on Enterprise Computing, E-Commerce, and E-Services (Year: 2008).*

"Francis Lishoy, Hancke Gerhard, Mayes Keith, Markantonakis Konstantinos", On the security issues of NFC enabled mobile phones, 2010, International Journal of Internet Technology and Secured Transactions, vol. 2, Nos. 3/4 (Year: 2010).*

* cited by examiner

SYSTEM AND METHOD FOR PROVIDING SOFTWARE-BASED CONTACTLESS PAYMENT

CROSS-REFERENCE TO RELATED APPLICATIONS

This application claims priority to U.S. Provisional Patent Application No. 61/547,910, filed Oct. 17, 2011, which is hereby incorporated by reference in its entirety.

FIELD OF THE DISCLOSURE

The present disclosure relates to a system and method for providing a software-based approach to contactless payments.

BACKGROUND OF THE DISCLOSURE

Near Field Communications, or NFC, allows for wireless communication between two devices in close proximity to each other. Many smartphones contain embedded NFC chips that can send encrypted data a short distance ("near field") to a reader located, for instance, next to a retail cash register. To complete a payment transaction, a customer must have their credit card information stored in a secure element of an NFC-enabled smartphone. This hardware-based solution presents numerous complications for a credit card issuer.

These and other drawbacks exist.

SUMMARY OF THE DISCLOSURE

Various embodiments of the disclosure provide systems and methods for software-based contactless payment. In an exemplary embodiment, a method for software-based contactless payment includes providing, via a network, a token to a mobile device of a customer for use with a transaction, receiving, via a network, the token in association with a transaction, and processing the token using a processor to determine whether to authorize the transaction.

The method may further include communicating, via a network, an authorization decision to the merchant and/or receiving, via a network, a request for the token from the customer. In various embodiments, the token may be received as track data in a credit card transaction. The method may further include receiving an identifier associated with the mobile device; and utilizing the identifier in the authorization determination.

A system for software-based contactless payment may include a token manager that generates a token and provides the token to a mobile device of a customer for use with a transaction, a communication interface that receives the token in association with a transaction, and a processor that processes the token using to determine whether to authorize the transaction.

The system may also include a payment processor to process the transaction and/or a database that stores a list of provided tokens, and wherein the authorization determination is based on a comparison of the received token to the list of provided tokens. The token manager may receive an identifier associated with the mobile device, and the processor may utilize the identifier in the authorization determination.

BRIEF DESCRIPTION OF THE DRAWINGS

Various embodiments of the present disclosure, together with further objects and advantages, may best be understood by reference to the following description taken in conjunction with the accompanying drawings, in the several Figures of which like reference numerals identify like elements, and in which.

DETAILED DESCRIPTION OF THE EMBODIMENTS

The following description is intended to convey a thorough understanding of the embodiments described by providing a number of specific exemplary embodiments and details involving systems and methods for providing a software-based approach to contactless payment. It should be appreciated, however, that the present disclosure is not limited to these specific embodiments and details, which are exemplary only. It is further understood that one possessing ordinary skill in the art, in light of known systems and methods, would appreciate the use of the invention for its intended purposes and benefits in any number of alternative embodiments, depending on specific design and other needs. A financial institution and system supporting a financial institution are used as examples for the disclosure. The disclosure is not intended to be limited to financial institutions only.

According to the various embodiments of the present disclosure, systems and methods are provided to enable a software-based approach to contactless payments. Such embodiments may provide, for example, a token-based, dynamic solution to contactless payments. In various embodiments, the token-based solution could be provided in an online environment, whereby, for example, a mobile device such as a smartphone could receive a token in "real-time" or near "real-time" via a communication network. The token-based solution could also be used in an offline manner, whereby a previously-provided token could be used for a certain period of time, regardless of whether the smartphone is connected to a communication network at the time of use. This token-based solution could eliminate the need for storing a credit card number and a cv code, for example, within a secure element on a smartphone. In effect, the tokens could serve as single-use, or limited-use credit card numbers.

The token-based solution could also allow credit-card issuers, for example, or any other token-issuer to set different types of parameters around the token. For example, transaction limits, use limits, time limits, and the like could be applied to the tokens. In other words, exemplary tokens could apply only to transactions of $100 or less, and/or only to 3 separate transactions before it expires, and only for 3 days.

In various embodiments, a token may be, for example, a multifaceted token, which may include, for example, numbers, letters and/or symbols that can be displayed on and/or typed into a mobile device. For example, the token could be a six- or eight-digit number re alphanumeric combination. The token may be randomly generated by a token manager or other entity for use by the token manager.

Figure 1:
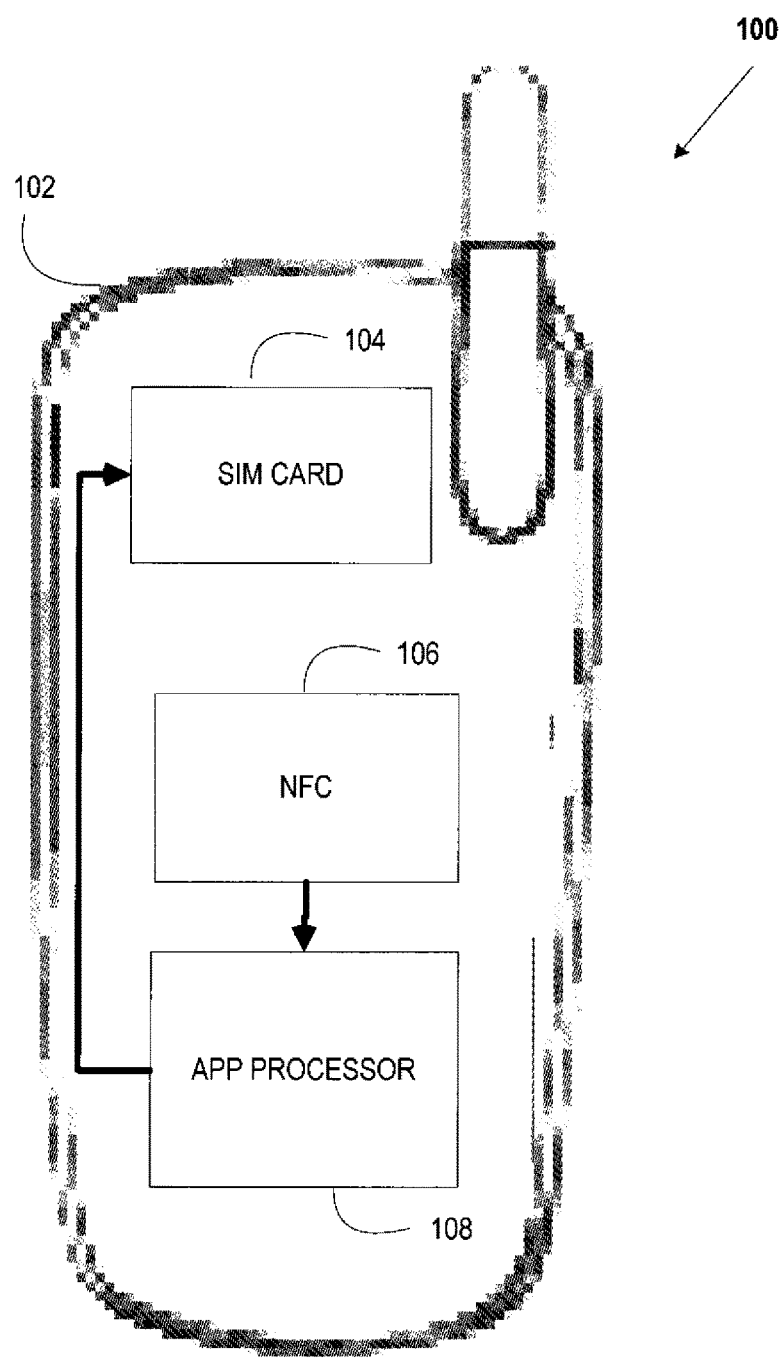
FIG. 1 depicts an exemplary embodiment of a contactless payment system.

FIG. 1 depicts an exemplary system 100 for use with the token-based software solution for contactless payment. As depicted in FIG. 1, system 100 may include a mobile device 102. Mobile device 102 may be any mobile device capable of executing the software-based solution for contactless payment. For example, mobile device 102 could be an iPhone, iPod, iPad from Apple® or any other mobile device running Apple's iOS operating system, any device running Google's Android® operating system, any device running Microsoft's Windows® Mobile operating system, and/or any other smartphone or like device.

Mobile device 102 may include for example, a Subscriber Identity Module (SIM) card 104, an NFC module 106, and an App Processor. SIM card 104 may be an integrated circuit that securely stores the service-subscriber key (IMSI) used to identify a subscriber on mobile telephony devices (such as mobile phones and computers). NFC module 106 may be an embedded NFC chip that can send encrypted data a short distance ("near field") to a reader located, for instance, next to a retail cash register. App Processor 108 may enable execution of software applications on mobile device 102. In various embodiments, app processor 108 may cooperate with NFC module 106 to enable a software-based approach to contactless payment using mobile device 102.

Mobile device 102 may also include various software components to facilitate software-based contactless payments. For example, mobile device 102 may include an operating system such as, for example, the iOS operating system from Apple, the Google Android operating system, and the Windows Mobile operating system from Microsoft. Mobile device 102 may also include, without limitation, software applications such as mobile banking applications to facilitate software-based contactless payment, an NFC application programming interface, and software to enable touch sensitive displays. Mobile device manufacturers may provide software stacks (APIs) which allow software applications to be written on top of the software stacks. For example, mobile device manufacturers may provide, without limitation, a card emulation API to enable NFC card emulation mode, a logic link control protocol (LLCP) API for peer-to-peer communication between mobile devices, and a real-time data (RTD) API and a NFC Data Exchange Format (NDEF) API for reading/writing.

Figure 2:
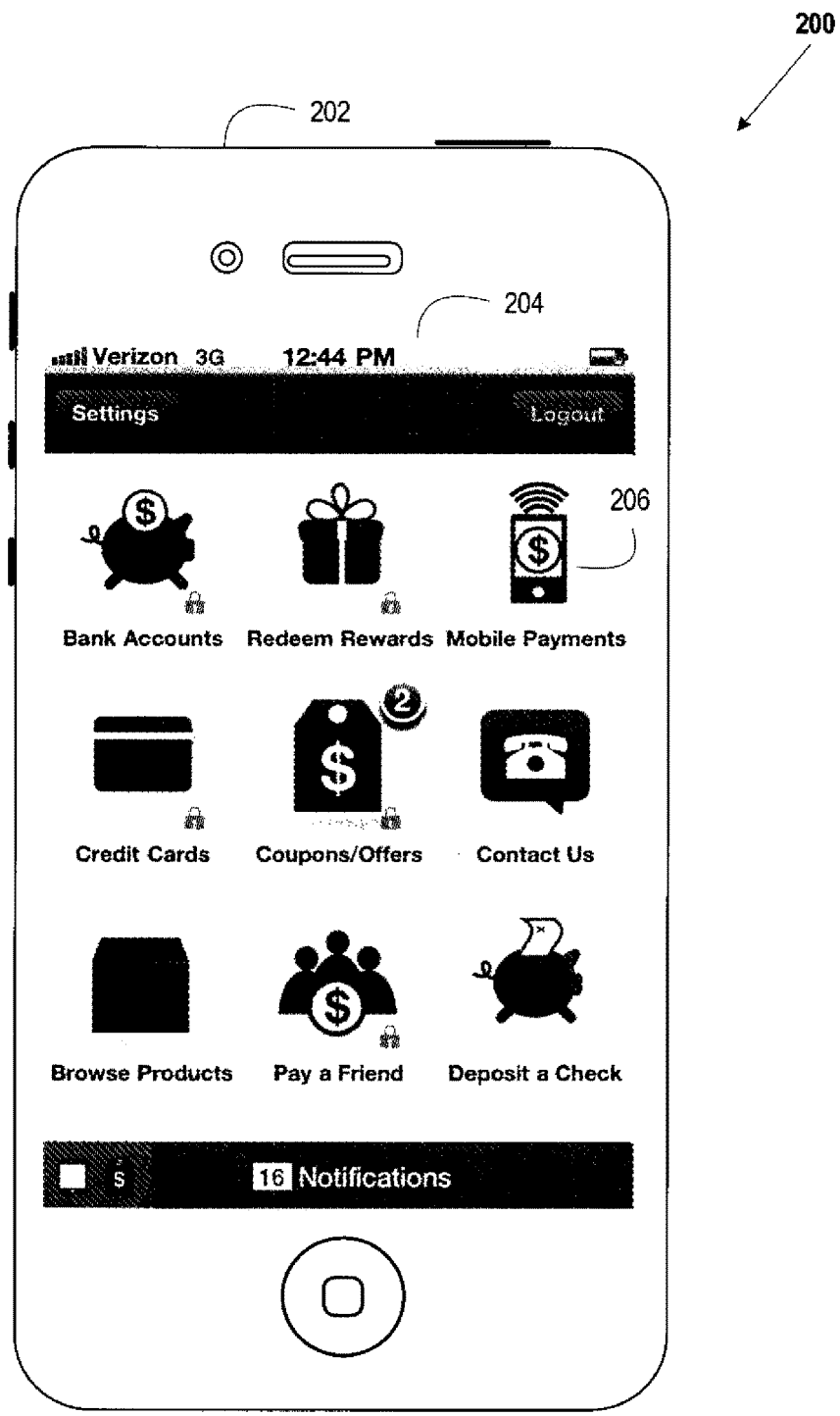
FIG. 2 depicts an exemplary embodiment of a contactless payment system.

FIG. 2 also depicts an exemplary system 200 for use with the token-based software solution for contactless payment. System 200 may include a mobile device 202. Mobile device 202 may include a display 204 which may display software, including software applications, executing on mobile device 202. By way of a non-limiting example, one of the software applications executing on mobile device 204 may include a mobile payments application 206. In various exemplary embodiments, mobile payments application 206 may enable a software-based solution to contactless payments. A user may select mobile payments application 206, by for example, touching display 204, which may then launch or otherwise cause the execution of mobile payments application 206.

Figure 3:
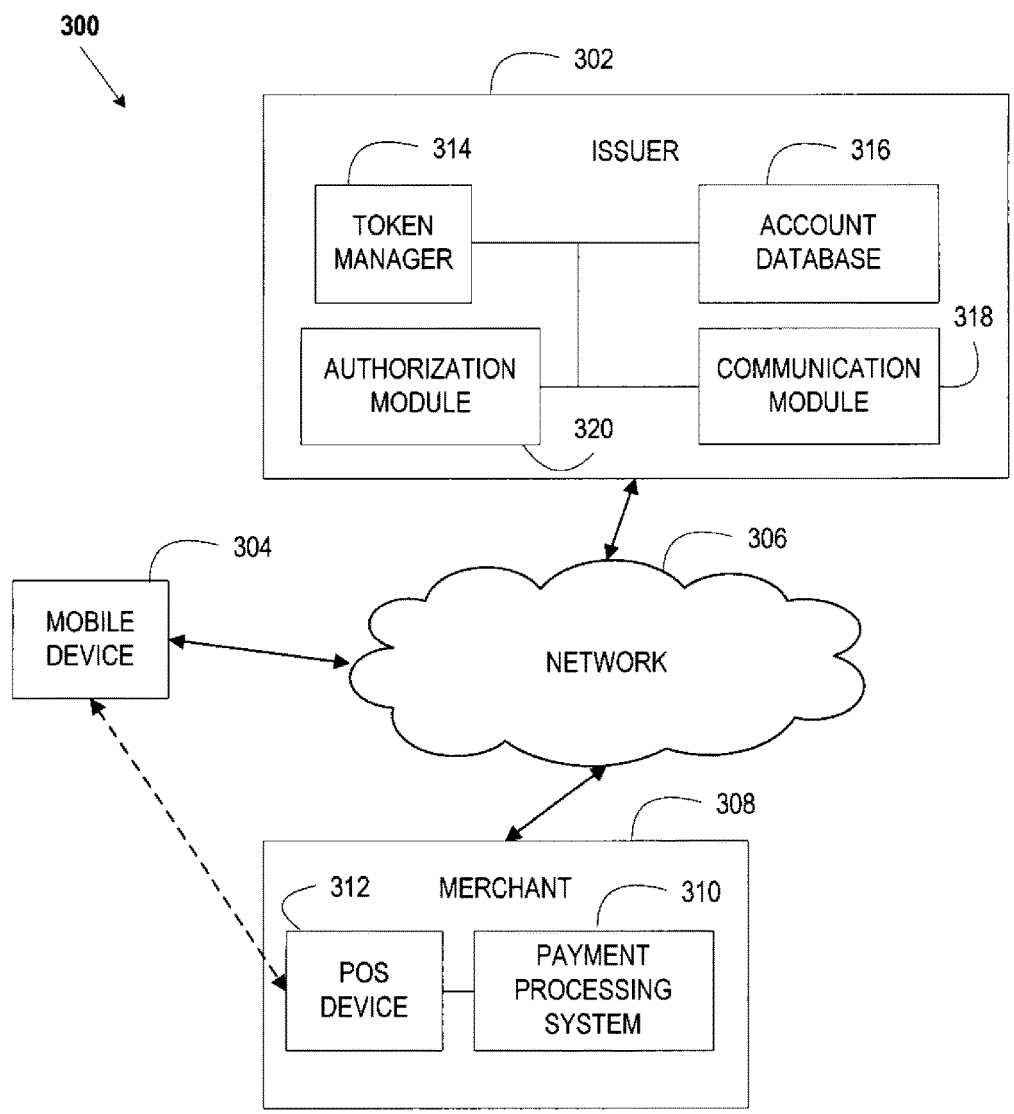
FIG. 3 depicts an exemplary embodiment of a contactless payment system.

FIG. 3 depicts an exemplary system 300 for use with the token-based software solution for contactless payment. System 300 may include an issuer system 302, a mobile device 304, a network 306, and a merchant system 308. In various embodiments, mobile device 304 may be similar to those described above with respect to FIGS. 1 and 2.

Network 306 may enable communication between mobile device 304, issuer 302, and merchant 308. For example, Network 306 may be one or more of a wireless network, a wired network or any combination of wireless network and wired network. For example, network 105 may include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11b, 802.15.1, 802.11n and 802.11g or any other wired or wireless network for transmitting and receiving a data signal.

In addition, network 306 may include, without limitation, telephone lines, fiber optics, IEEE Ethernet 902.3, a wide area network ("WAN"), a local area network ("LAN"), or a global network such as the Internet. Also network 306 may support an Internet network, a wireless communication network, a cellular network, or the like, or any combination thereof. Network 105 may further include one network, or any number of the exemplary types of networks mentioned above, operating as a stand-alone network or in cooperation with each other. Network 306 may utilize one or more protocols of one or more network elements to which they are communicatively coupled. Network 306 may translate to or from other protocols to one or more protocols of network devices. Although network 306 is depicted as a single network, it should be appreciated that according to one or more embodiments, network 306 may comprise a plurality of interconnected networks, such as, for example, the Internet, a service provider's network, a cable television network, corporate networks, and home networks.

Issuer system 302 may include, for example, a token manager 314, an account database 316, a communication module 318, and an authorization module 320. Token manager may generate, maintain, and provide information relating to the tokens used in the software-based solution for contactless payments. In various embodiments, token manager 314 may be integrated into issuer system 302 as depicted in FIG. 3. Token manager 314 may also be a third-party system that works in cooperation with issuer system 302 to generate, maintain, and provide tokens for use in the software-based solution for contactless payments. Account database 316 may maintain information relating to the accounts of customers associated with an issuer. As referred to herein, an issuer may include, for example, a credit card issuer, or any other issuer of tokens for contactless payment. Account database 316 may also include an association of tokens with respective customers. For example, account database 316 may include an association of a token "123456" with account number "1234 5678 9012 3456," which belongs to John Q. Cardholder. As will be described in more detail below, account database 316 may be accessed for authorizing transactions and or payment requests.

Communication module 318 may enable communication between the components of system 300. Communication module 318 may include hardware, software, and firmware that may enable communication between an issuer system 302 and other components of system 300 using network 306, for example.

Authorization module 320 may include business logic used to determine whether a transaction or payment request should be authorized. For example, authorization module 320 may include executable programs that determine whether the token is associated with the correct mobile device and/or issuer account and whether the token use is within the limiting parameters before authorizing a particular transaction. Authorization module 320 may cooperate with communication module 318 to communicate authorization decisions to merchant 308 and/or mobile device 304.

Merchant 308 may include a Point of Sale (PoS) device 312 and a payment processing system 310. In various embodiments, PoS 312 may be any device that may receive NFC communication, for example and can be utilized to process payment transactions. PoS device 312 may be for example, PoS devices made by VeriFone® and/or any other like devices. As illustrated in FIG. 3 by the dotted line connecting mobile device 304 to PoS device 312, mobile device 304 may be communicatively coupled with PoS device 312 using near field communication, or NFC.

Payment processing system 310 may allow merchant 308 to request and process payments, for example. Payment processing system 310 may utilize network 306 to communicate payment requests to issuer system 302 and receive authorization requests. In doing so, payment processing system 310 may transmit information to issuer system 302 using, for example, networks maintained by Visa®, MasterCard®, Discover®, American Express® and the like. Also, payment processing system 310 may be capable of communicating token information using data standards defined by the above-described networks as will be describe in detail below.

Figure 4:
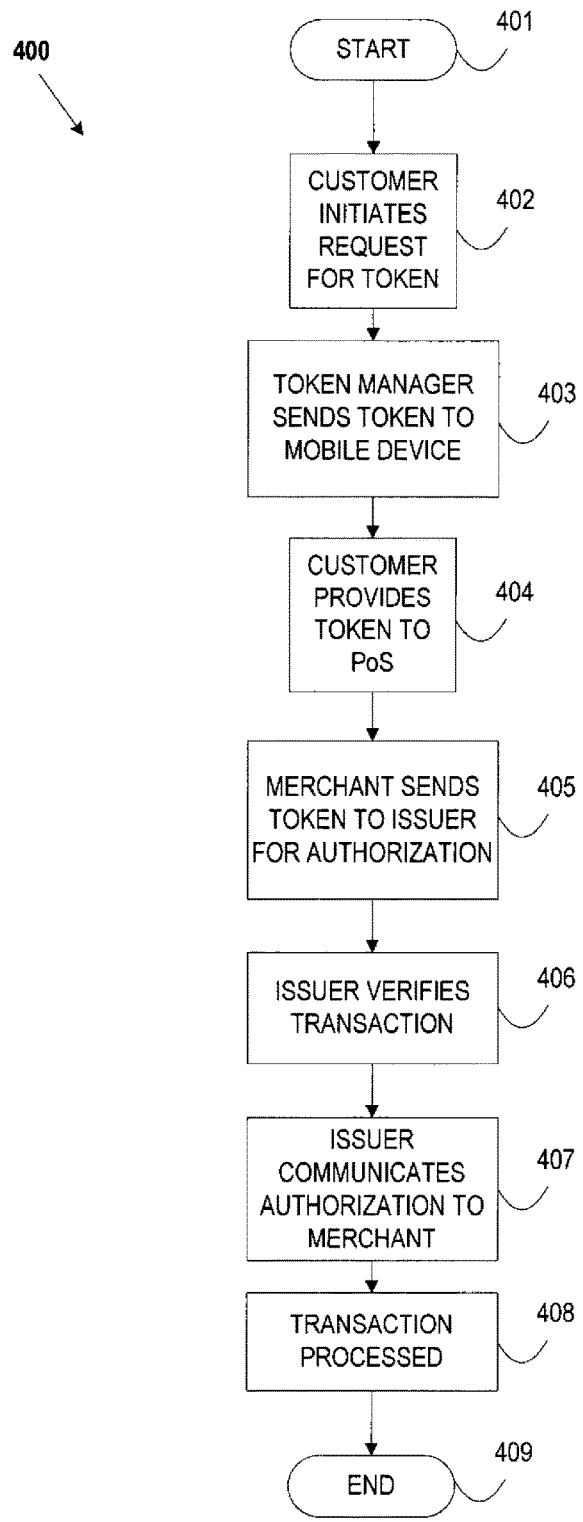
FIG. 4 depicts an exemplary method for contactless payment.

FIG. 4 depicts an exemplary method 400 for a software-based approach to contactless payment. Method 400 may begin in block 401.

In block 402, a customer may initiate a request for a token. In various embodiments, a customer may utilize a mobile device enables for software-based contactless payment to "tap" a PoS device, for example to initiate the request for a token at the time of a transaction. A customer may also initiate a request by requesting a token through a mobile payments application using a mobile device. In various embodiments, a customer may request a token before or at the time of purchase to enable or facilitate the customer's purchase. A customer may use a software application, such as a mobile banking or like application to facilitate the request for a token. To access the software application, a user may be required to enter a personal identification number (PIN) to unlock the access and/or unlock the software application. The customer may also present responses to multifactor authentication requests or challenges. In this way, the token associated with a PIN and/or multifactor authentication may provide additional security for a transaction.

In block 403, the token may be sent to a customer's mobile device. For example, a token manager may send a token to mobile device using a communication network and/or various communications similar to those described in FIG. 3. Also, a token manager may transmit a token to a mobile device via, for example, authorization networks and/or a network associated with a PoS device. The token may be received at the mobile device and then processed by a software application executing on the mobile device to facilitate software-based contactless payment. The software application may, for example, display the token to the customer on the mobile device.

In block 404, a customer may provide the token to a PoS device. This token could be provided at the time of purchase. For example, a could input the token on a keypad of the PoS device. The customer may also utilize the NFC features on the mobile device to transmit the token to the PoS device wirelessly. Upon receipt of the token at the mobile device, the token may be displayed to the customer and then the customer may touch a "transmit" button appearing on the display of the mobile device to transmit the token via NFC. Other methods of communicating the toke may be used.

Upon receipt of the token, the merchant, using a payment processing system, for example, in cooperation with the PoS device, may format the token into a data format that may be utilized by one of the various authorization networks. For example, an exemplary 6-digit token may be inserted into one of the "tracks" of data utilized by the Visa or other authorization networks to transmit and receive data. A token may also be transmitted in a data packet via a communication network associated with a merchant, for example. In various embodiments, a customer may be required to input a PIN and/or respond to a multifactor authentication challenge before transmitting or providing the token to a PoS device.

In block 405, the merchant may send the token to the issuer for authorization. For example, the merchant may send a token to the issuer using a communication network and/or various communications similar to those described in FIG. 3.

In block 406, the issuer and/or token manager may verify the token and/or transaction utilizing the token. For example, the issuer may use the token to look up the account of the customer and determine whether the transaction should be authorized. The issuer and/or token manager may also check the token against certain parameters to determine, for example, whether the transaction complies with certain parameters or the token has expired. In various embodiments, the issuer and/or token manager may receive and utilize location information or identification information associated with the customers mobile device to determine whether to authorize the transaction. For example, the issuer and/or token manager may receive and utilize the MAC address of a smartphone and/or the merchant location to determine whether to authorize the transaction.

In block 407, the issuer and/or token manager may communicate the authorization to the merchant. The authorization may indicate, for example, that the token provided by the customer matches the token provided to the customer upon request by the customer and/or the token matches a limited use token. The authorization may also indicate that the customer may have sufficient funds to make a purchase.

In block 408, the transaction may be processed. For example, the transaction may be processed by an issuer to post the transaction to the customer's account and ensure payment to the merchant.

In the preceding specification, various preferred have been described with references to the accompanying drawings. Although the above description references an "issuer" it will be understood that the term issuer could apply to issuers of credit, debit, and like payment mechanisms. It will also be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

The invention claimed is:

1. A method for software-based contactless payment, comprising:
   receiving, from a customer mobile device via a communication network, a request for a token for use with a transaction;
   generating, using a processor, the token in response to the request, wherein the token comprises randomly generated alphanumeric characters;
   providing, via the communication network when the customer mobile device is in an online environment, the token to the customer mobile device in real-time by a real-time data application programming interface for use with the transaction, wherein the token is stored within an app processor of the customer mobile device that is connectively coupled to an embedded NFC chip and the customer mobile device enables an NFC emulation mode by a card emulation application programming interface;

receiving, through an authorization network from a merchant system via the customer mobile device embedded NFC chip and an NFC data exchange format application programming interface configured for reading and writing, the token in association with a transaction and transaction data, wherein the token is formattable by the merchant system into a track of data utilized directly by the authorization network;

comparing the received token and transaction data to a database of provided tokens, wherein each provided token is associated with a parameter requirement, including transaction limits, use limits and time limits, wherein at least one parameter requirement enables a previous token to be used for a defined period of time to enable a transaction when the customer mobile device lacks a connection to the communication network; and transmitting, via the authorization network, an authorization response based on the comparison, wherein a transaction is authorized when the received token matches a token in the database and the transaction data complies with the parameter requirement.

2. The method of claim 1, wherein the authorization response is transmitted to the merchant system.

3. The method of claim 1, wherein the token is provided and received by an issuer system.

4. The method of claim 1, wherein the received token is transmitted in response to receiving a personal identification number provided by the customer via the customer mobile device.

5. The method of claim 1, further comprising:
receiving, from the customer mobile device, an identifier associated with the customer mobile device; and
utilizing the identifier in the authorization determination.

6. A system for software-based contactless payment, comprising:
a token manager that:
generates a token in response to receiving a request for the token via a communication network from a customer mobile device, wherein the token comprises randomly generated alphanumeric characters, and
transmits the token to the customer mobile device in an online environment in real-time by a real-time data application programming interface for use with a transaction, wherein the token is stored within an app processor of the customer mobile device, the app processor connectively coupled to an embedded NFC chip and the customer mobile device enables an NFC emulation mode by a card emulation application programming interface;
a communication interface that receives, through an authorization network from a merchant system via the customer mobile device embedded NFC chip and an NFC data exchange format application programming interface configured for reading and writing, the token in association with the transaction and transaction data, wherein the token is formattable by the merchant system into a track of data utilized directly by the authorization network; and
a processor that:
compares the received token and transaction data to a database of provided tokens, wherein each provided token is associated with a parameter requirement, including transaction limits, use limits and time limits, wherein at least one parameter requirement enables a previous token to be used for a defined period of time to enable a transaction when the customer mobile device lacks a connection to the communication network, and
authorizes a transaction when the received token matches a token in the database and the transaction data complies with the parameter requirement, wherein the communication interface transmits the authorization via the authorization network.

7. The system of claim 6, wherein the authorization is transmitted to the merchant system.

8. The system of claim 6, wherein the token is provided and received by an issuer system.

9. The system of claim 6, wherein the received token is transmitted in response to a receiving personal identification number provided by the customer via the customer mobile device.

10. The system of claim 6, wherein the token manager receives an identifier associated with the customer mobile device from the customer mobile device, and the processor utilizes the identifier in the authorization determination.

11. The method of claim 1, wherein the parameter requirements comprise a location limit, wherein the transaction information comprises customer mobile device location information and merchant location information.

12. The system of claim 6, wherein the parameter requirements comprise a location limit.

13. The system of claim 6, wherein the parameter requirements comprise a location limit, wherein the transaction information comprises customer mobile device location information and merchant location information.

14. The method of claim 5, wherein the identifier associated with the customer mobile device is retrieved from the SIM card of the customer mobile device that securely stores the identifier.

15. The method of claim 1, wherein the received token is transmitted in response to receiving a multifactor authentication challenge provided by the customer via the customer mobile device.

16. The system of claim 10, wherein the identifier associated with the customer mobile device is retrieved from the SIM card of the customer mobile device that securely stores the identifier.

17. The system of claim 6, wherein the received token is transmitted in response to receiving a multifactor authentication challenge provided by the customer via the customer mobile device.

* * * * *